(12) United States Patent
Wang

(10) Patent No.: US 9,661,675 B2
(45) Date of Patent: May 23, 2017

(54) METHOD AND DEVICE FOR REINITIATING SESSION MANAGEMENT PROCESS OF EPS SYSTEM

(71) Applicant: China Academy Of Telecommunications Technology, Beijing (CN)

(72) Inventor: Hucheng Wang, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 453 days.

(21) Appl. No.: 13/691,754

(22) Filed: Dec. 1, 2012

(65) Prior Publication Data

US 2013/0163559 A1 Jun. 27, 2013

Related U.S. Application Data

(63) Continuation of application No. PCT/CN2011/080774, filed on Oct. 14, 2011.

(30) Foreign Application Priority Data

Oct. 15, 2010 (CN) .......................... 2010 1 0515715

(51) Int. Cl.
*H04W 4/00* (2009.01)
*H04W 76/02* (2009.01)
*H04W 36/00* (2009.01)

(52) U.S. Cl.
CPC ...... *H04W 76/027* (2013.01); *H04W 36/0011* (2013.01)

(58) Field of Classification Search
CPC ..................... H04W 36/0011; H04W 76/027
See application file for complete search history.

(56) References Cited

U.S. PATENT DOCUMENTS

2011/0199905 A1* 8/2011 Pinheiro et al. .............. 370/235
2011/0294509 A1* 12/2011 Kim et al. .................... 455/436
(Continued)

FOREIGN PATENT DOCUMENTS

CN 101325794 A 12/2008
CN 101599818 A 12/2009
(Continued)

OTHER PUBLICATIONS

Extended European Search Report with Supplementary European Search Report for application No. 11832053.0, dated Nov. 29, 2016.
(Continued)

*Primary Examiner* — Kevin C Harper
(74) *Attorney, Agent, or Firm* — Ladas & Parry, LLP

(57) ABSTRACT

The present invention discloses a method and device for re-initiating EPS session management procedure. The application of technical solution proposed through embodiment of this invention can enable PGW to determine whether handover operation on MME side is completed through timing by timer and/or instruction message on MME side; if it is completed, re-initiate session management process of corresponding EPS system, thus enabling PGW to timely re-initiate EPS session management procedure, reducing the time for unnecessary waiting, and avoiding resource waste caused by repeated rejection of EPS session management procedure re-initiated when handover procedure is not completed, so as to improve reconnection efficiency of session management process of EPS system and reduce waste of communication resource.

12 Claims, 5 Drawing Sheets

(56) References Cited

U.S. PATENT DOCUMENTS

| | | | |
|---|---|---|---|
| 2012/0002545 A1* | 1/2012 | Watfa et al. | 370/235 |
| 2012/0157132 A1* | 6/2012 | Olsson | H04W 68/00 455/458 |

FOREIGN PATENT DOCUMENTS

| | | |
|---|---|---|
| CN | 101626611 A | 1/2010 |
| CN | 101742453 A | 6/2010 |
| CN | 102111745 | 6/2011 |
| EP | 2439979 | 4/2012 |
| WO | 2010105545 A1 | 9/2010 |

OTHER PUBLICATIONS

3GPP TSG CT4: "LS on Handling of Dedicated bearer related procedures during handover", 3GPP draft; S2-104471_S2-103973_C4-102383, 3$^{rd}$ generation partnership project (3GPP), Mobile Competence Centre; 650, Route Des Lucioles; F-06921 Sophia-Antipolis Cedex; France, vol. SA WG2, no. Prague; 20101011, Sep. 29, 2010 (Sep. 29, 2010), XP050459337, [retrieved on Sep. 29, 2010].

Cisco: "Rejecting the Dedicated bearer related procedure from MME to SGW and PGW", 3GPP Draft; C4-102306_29274_CR0726R1_Procedurerejection_REL9, 3$^{rd}$ Generation Partnership Project (3GPP), Mobile Competence Centre; 650, Route Des Lucioles; F-06921 Sophia-Antipolis Cedex; France, vol. SA WG2, no. Prague; 20101011, Sep. 29, 2010 (Sep. 29, 2010), XP050459320, [retrieved on Sep. 29, 2010].

SA2: "Reply LS on Handling of dedicated bearer related procedures during handover", 3GPP Draft; C4-102886, 3$^{rd}$ Generation Partnership Project (3GPP), Mobile Competence Centre; 650, Route Des Lucioles; F-06921 Sophia-Antipolis Cedex; France, vol. CT WG4, no. Jacksonville; 20101115, Oct. 25, 2010 (Oct. 25, 2010), XP050464172, [retrieved on Oct. 25, 2010].

PCT International Preliminary Report on Patentability Chapter I for Application No. PCT/CN2011/080774, dated Apr. 16, 2013 with English translation from WIPO.

ISR/WO for related PCT/CN2011/080774 dated Jan. 19, 2012 and its English translation.

Notification of Reexamination from a related Chinese Patent Appln No. 2010105157152 dated Apr. 3, 2015 and its English translation.

Office Action from a related Chinese Patent Appln No. 2010105157152 dated Apr. 2, 2013 and its English translation.

Office Action from a related Chinese Patent Appln No. 2010105157152 dated Oct. 28, 2013 and its English translation.

Office Action from a related Chinese Patent Appln No. 2010105157152 dated May 14, 2014 and its English translation.

3GPP TSG SA2. LS on Handling of dedicated bearer related procedures during handover. SA WG2 Meeting #S2-80, Brunstand, Norway, S2-103973, Sep. 3, 2010, pp. 1-2.

Cisco. Rejecting the dedicated bearer related procedure from MME to SGW and PGW. 3GPP TSG CT4 Meeting #50, Xi'an, P.R. China, C4-102049, Aug. 27, 2010, pp. 1-5.

* cited by examiner

METHOD AND DEVICE FOR REINITIATING SESSION MANAGEMENT PROCESS OF EPS SYSTEM

CROSS REFERENCE TO RELATED APPLICATIONS

This application is a continuation of PCT/CN2011/080774 filed on Oct. 14, 2011, which claims priority to Chinese Patent Application No. 201010515715.2 entitled "Method and Device for Re-initiating Session Management Process of EPS System" filed in the Patent Office of the People's Republic of China on Oct. 15, 2010, the disclosures of which are hereby incorporated by reference in their entirities.

FIELD OF THE INVENTION

The embodiments of the present invention relates to the field of communication technology, in particular to a method and device for re-initiating session management process of Evolved Packet System (EPS).

BACKGROUND OF THE INVENTION

In the present 3GPP (Third Generation Partnership Project) protocol, when handover procedure is implemented by MME (Mobility Management Entity), and any process irrelevant to Handover such as bearer activation/modification/deactivation, Location reporting control or NAS message transfer (Non Access Stratum message transfer), etc. occurs, MME needs to delay these processes and implement them until handover procedure is completed, or these processes are deemed to have failed.

This is described in TS 23.401:

TS23.401 Subclause 5.5.1.1.1

If the MME receives a rejection to a NAS procedure (e.g. dedicated bearer establishment/modification/release; location reporting control; NAS message transfer; etc.) from the eNodeB with an indication that an X2 handover is in progress (see TS 36.300 [5]), the MME shall reattempt the same NAS procedure either when the handover process is complete or the handover is deemed to have failed. The failure is known by expiry of the timer guarding the NAS procedure.

TS23.401 Subclause 5.5.1.2.1

If the MME receives a rejection to an S1 interface procedure (e.g. dedicated bearer establishment/modification/release; location reporting control; NAS message transfer; UE Context Modification Request message with a CS Fallback indicator; etc.) from the eNodeB with an indication that an S1 handover is in progress (see TS 36.300 [5]), the MME shall reattempt the same S1 interface procedure when either the handover process is complete or is deemed to have failed if the MME is still the serving MME (if the MME is no longer serving the UE, then the procedure fails).

At CT4#50 meeting, Cisco puts forward that when Dedicated Bearer Activation/Modification/Deactivation initiated by PGW (Packet Data Network Gateway) on CR C4-102306 conflicts with handover procedure, MME shall use new cause to reject dedicated bearer activation/modification/deactivation process.

C4-102306

"Temporarily rejected due to handover procedure in progress" is used by the MME for the dedicated bearer related procedure initiated by the PGW. When the X2 based handover with/without SGW change or S1 based handover with/without SGW and/or MME change is in progress, the MME may receive Create/Update/Delete Bearer request message for the dedicated bearer creation, modification or deletion initiated by the PGW. If the handover procedure results in the SGW and/or MME change, then the dedicated bearer related procedure cannot be handled temporarily by the MME till the handover procedure is completed. In that case the MME shall reject the dedicated bearer related procedure with this reject cause.

A method for handling reject cause returned by MME and received by PGW is mentioned in LS of CT4 given by SA2:

PGW locally sets the timer and re-initiates corresponding processes.

S2-104091

Question 2: CT4 believes that, in the above scenario, the appropriate action for the PGW is to wait for locally configured time and then re-initiate the dedicated bearer related procedure. Does SA2 have different opinion?

During implementation of the embodiments of the present invention, the applicant finds that the following problems at least exist in the available technology:

In the present technology, MME only uses new cause value to reject dedicated bearer related procedure initiated by PGW, and PGW re-initiates them through setting local timer. However, PGW cannot know when handover procedure is completed.

Therefore, due to inaccurate time of locally-configured timer, handover procedure is still in progress when timer times out, thereby processes re-initiated by PGW are rejected again; It may also occur that timer doesn't time out within a long time after handover procedure is completed, while UE (User Equipment) is quickly in Idle after completion, which may lead to re-paging of UE when PGW re-initiates dedicated bearer related procedure.

SUMMARY OF THE INVENTION

The embodiments of the present invention provide a method and device for re-initiating session management process of EPS system, to resolve the problem that the present technology can't determine when to re-initiate session management process of EPS system, because of it can't determine the end time of Handover process accurately.

To achieve the above objective, the embodiments of the present invention provide a method for re-initiating session management process of EPS system on one hand, including:

After session management process of EPS system initiated by packet data gateway (PGW) is rejected by mobility management entity (MME) for handover procedure is in progress, said PGW starts the timer according to the information sent by said MME;

When said timer times out or said PGW receives instruction message before said timer times out, said PGW re-initiates session management process of corresponding EPS system.

Moreover, embodiments of this invention also provide a kind of PGW, including:

Sending module, which is used to initiate session management process of EPS system to MME;

Reception module, which is used to receive the information sent by said MME after session management process of EPS system initiated by said sending module is rejected by MME for handover procedure is in progress;

Timer processing module, which is used to start the timer according to the information received by said reception module;

Judgment module, which is used to notify said sending module to re-initiate session management process of corresponding EPS system when the timer started by said timer processing module times out or said reception module receives instruction message before the timer re-initiated by said timer processing module times out.

Moreover, embodiments of this invention also provide a method for re-initiating session management process of EPS system, including:

When MME receives request from PGW for initiating session management process of EPS system, if said MME judges itself is in handover procedure, said MME sends message containing instruction information to said PGW, to enable said PGW to start corresponding timer for re-initiating session management process of corresponding EPS system.

Moreover, embodiments of this invention also provide a kind of MME, including:

Judgment module, which is used to judge whether said MME is in handover procedure when receiving request from PGW for initiating session management process of EPS system;

Sending module, which is used to send message containing instruction information to said PGW when judgment result of said judgment module is "Yes", so as to enable said PGW to start corresponding timer for re-initiating session management process of corresponding EPS system.

Moreover, embodiments of this invention also provide a method for re-initiating session management process of EPS system, including:

After session management process of EPS system initiated by PGW is rejected by MME for handover procedure is in progress, if said PGW receives instruction message, said PGW re-initiates session management process of corresponding EPS system to said MME.

Moreover, embodiments of this invention also provide a kind of PGW, including:

Communication module, which is used to initiate session management process of EPS system to MME and receive the message sent by said MME;

Identification module, which is used to identify whether said communication module receives instruction message after session management process of EPS system initiated by said sending module is rejected by MME for handover procedure is in progress, and also notify said communication module to re-initiate session management process of corresponding EPS system to said MME when identification result is "Yes".

Moreover, embodiments of this invention also provide a method for re-initiating session management process of EPS system, including:

When MME receives request from PGW for initiating session management process of EPS system, if said MME judges itself is in handover procedure, said MME rejects the request of session management process of said EPS system;

After the completion of said handover procedure, said MME sends instruction message to said PGW to notify said PGW to re-initiate session management process of corresponding EPS system.

Moreover, embodiments of this invention also provide a kind of MME, including:

Judgment module, which is used to judge whether said MME is in handover procedure when receiving request from PGW for initiating session management process of EPS system, and judge whether said handover procedure is completed when judging said MME is in handover procedure;

Sending module, which is used to send instruction message to said PGW to notify said PGW to re-initiate session management process of corresponding EPS system when said judgment module judges said handover procedure is completed.

Compared with present technology, the embodiments of the present invention have the following advantages:

The application of technical solution proposed through embodiments of this invention can enable PGW to determine whether handover operation on MME side is completed through timing by timer and/or instruction message on MME side; if it is completed, re-initiate session management process of corresponding EPS system, thus enabling PGW to timely re-initiate session management process of EPS system, reducing the time for unnecessary waiting, and avoiding resource waste caused by repeated rejection of session management process of EPS system re-initiated when handover procedure is not completed, so as to improve reconnection efficiency of session management process of EPS system and reduce waste of communication resource.

BRIEF DESCRIPTION OF THE DRAWINGS

To further explain the technical solution of the embodiments of the present invention or available technology, the drawings required will be briefly introduced below. Obviously, the following described drawings only refer to some embodiments of the present invention. Common technical personnel of the field can obtain other drawings according to these drawings without contributing creative work.

DETAILED DESCRIPTION OF THE EMBODIMENTS OF THE INVENTION

The technical solution of the embodiments of the present invention will be described clearly and completely in combination with the attached drawings. Apparently, the described embodiments are only a part rather than all of the embodiments of the present invention. Other embodiments based on the embodiments of the present invention obtained by common technical personnel of the field without contributing creative work shall be protected by the present invention.

As described in "Background of the invention", it is mentioned in the present 3GPP protocol that when handover procedure is implemented by MME, and any session management process of EPS system irrelevant to handover procedure (including bearer activation/modification/deactivation, location reporting control or NAS message transfer, etc.) occurs, MME shall delay these processes until handover procedure is completed, or these processes shall be deemed to have failed. Meanwhile, in the present technical solution, when dedicated bearer activation/modification/deactivation initiated by PGW conflicts with Handover, MME shall reject these processes.

However, after dedicated bearer related procedures initiated by PGW are rejected, it is only mentioned in the present technical solution that these processes will be re-initiated until handover procedure is completed. In practical application, PGW may not know when handover procedure is completed.

Determination of handover completion time through timer is mentioned in the present technical solution. However, it is difficult to ensure accuracy of the time determined by timer. Furthermore, in inter-SGW (Signalling Gateway) or other handover contexts with S5/S8 interface signalling, when handover procedure is completed, SGW will send Modify Bearer Request message to PGW. At this time, PGW can definitely judge that handover procedure is completed according to previously received cause value without setting local timer.

Based on the above description, it can be seen that there is not a good solution to solve such problems in the present technology. Therefore, the present invention puts forward a method for re-initiating session management process of EPS system to solve the above problems. Furthermore, based on whether it is necessary to start timer, technical solution put forward by the embodiments of the present invention can be divided into the following two kinds:

Solution I: Start Timer

Figure 1:
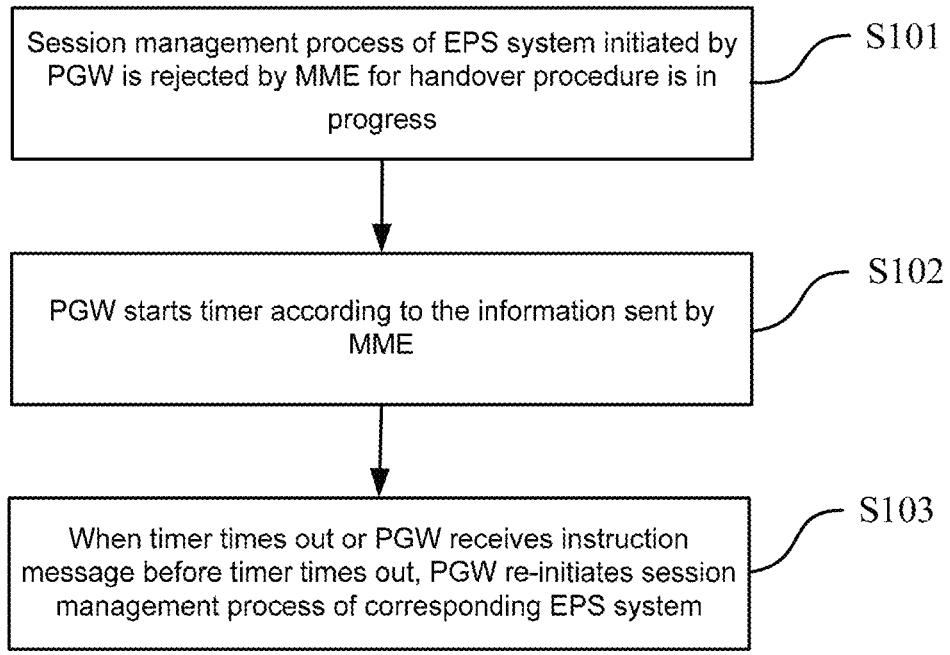
FIG. 1 is a flow diagram of a method for re-initiating session management process of EPS system put forward by the embodiments of the present invention.

The flow diagram of a method for re-initiating session management process of EPS system put forward by the embodiments of the present invention is shown in FIG. 1, including the following steps:

Step S101: Session management process of EPS system initiated by PGW is rejected for handover procedure is in progress.

Step S102: PGW starts timer according to the information sent by MME.

According to the content of the information sent by MME, this step is divided into two conditions below:

Condition I: When PGW receives the message containing the information of rejecting cause sent by MME and if the content of such information conforms to preset condition, PGW will start preset timer.

Under this condition, when timer is preset in PGW and reject cause meets preset requirement, PGW will start corresponding timer for timing.

For example: PGW sets timer for processes that are rejected due to handover procedure. Then when PGW determines that processes initiated by PGW are rejected for MME is in handover procedure, PGW will start corresponding timer for timing.

Under this condition, PGW can estimate the time consumed during handover procedure in advance according to certain rules. This time can be obtained through analyzing corresponding statistical data in PGW or be set according to unified standard. However, the change of specific time setting standard will not influence protection scope of the present invention.

Under this condition, determine whether timer shall be started according to reject cause returned by MME, which can effectively perform timing with timer for rejected session management process of EPS system due to handover procedure, and thus pointedly preset time value of timer.

Condition II: When receiving the message containing the information of handover completion time sent by MME, PGW will start the timer set according to the information of handover completion time.

Under this condition, PGW can directly set time value of timer according to the information of handover completion time returned by MME, thus handover timing can be conducted accurately.

Herein, the information of handover completion time is determined by said MME according to the connection quantity of current public data network (PDN) of corresponding terminal unit and statistical information of current handover delay.

Step S103: When timer times out or PGW receives instruction message before timer times out, PGW re-initiates session management process of corresponding EPS system.

For this step, in actual operation, PGW performs timing based on the time set by timer to determine whether handover procedure is completed. If timer times out, PGW will directly re-initiate session management process of corresponding EPS system. Otherwise, it continues to perform timing.

However, in this process, the embodiments of the present invention further provide re-initiating trigger mechanism of instruction message, that is to say no matter timer times out or not, PGW will directly re-initiate session management process of corresponding EPS system as long as PGW receives instruction message.

In specific application context, before timer times out, PGW will receive instruction message, including:

Before timeout of timer, PGW receives Modify Bearer Request message through S5/S8 interface.

In actual application, Modify Bearer Request message received by PGW is forwarded by SGW or triggered by SGW according to Create Bearer Request message, but the change of specific source will not influence protection scope of this invention.

It should be pointed out that the aforementioned Modify Bearer Request message is only a specific embodiment of instruction message. Other messages are also applicable to technical solution put forward by the embodiments of the present invention if they achieve the same technical effect required by those embodiments. Such changes will not influence protection scope of the present invention.

In the following parts, similar condition exists in instruction message and the explanation for specific type of session management process. However, changes of specific type will not influence protection scope of the present invention, which is not explained in detail below.

It should be pointed out that in the descriptions above, corresponding to specific application context, session management process of EPS system specifically includes session management process of dedicated bearer. Said session management process in the embodiments of the present invention specifically refers to management process such as PDN connection or EPS bearing establishment, tunnel revision or deletion, which is similar to that in the following parts.

The above process refers to the realization procedure on PGW side for re-initiating method of session management process of EPS system put forward by the embodiments of the present invention. There is corresponding processing procedure on corresponding MME side, which is not explained here again.

It should be further pointed out that the aforementioned timer is used to perform timing for handover completion, viz. determining the time of re-initiating session management process of EPS system. In specific application context, any technical solution which can realize the same technical effect can be applied to technical solution put forward by the embodiments of the present invention. However, changes of specific realization form will not influence protection scope of the present invention.

Solution II: Not to Start the Timer

Figure 2:
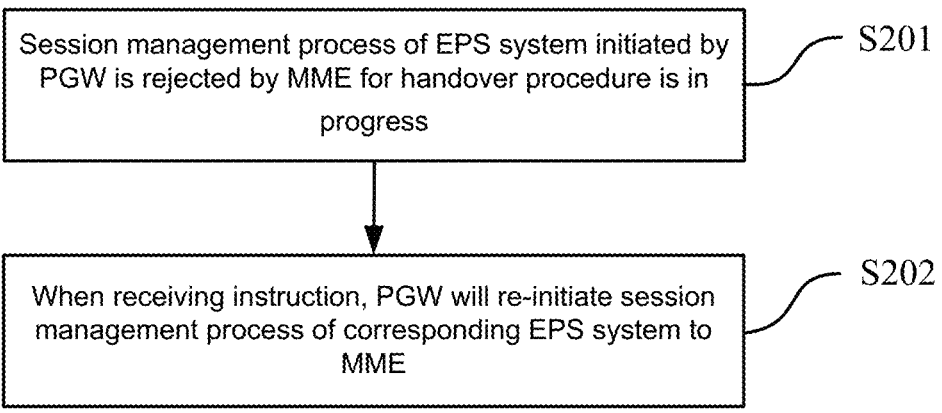
FIG. 2 is a flow diagram of a method for re-initiating session management process of EPS system put forward by the embodiments of the present invention.

The flow diagram of a method for re-initiating session management process of EPS system put forward by the embodiments of the present invention is shown in FIG. 2, including:

Step S201: Session management process of EPS system initiated by PGW is rejected by MME for handover procedure is in progress.

Step S202: When receiving instruction message, PGW re-initiates session management process of corresponding EPS system to MME.

Herein, instruction message is used to notify PGW that current handover procedure is completed. In specific application context, such instruction message refers to:

Before timeout of timer, PGW receives Modify Bearer Request message through S5/S8 interface. In actual application, modify bearer request message received by PGW is forwarded by SGW or triggered by SGW according to create bearer request message, but the change of specific source will not influence protection scope of this invention.

Similar to Solution I, in the descriptions above, session management process of EPS system comprises that of dedicated bearer process corresponding to specific application context.

The above process refers to the realization procedure on PGW side for re-initiating method of session management process of EPS system put forward by the embodiments of the present invention. There is corresponding processing procedure on corresponding network side (MME or SGW), which is not explained here again.

Compared with present technology, the embodiments of the present invention have the following advantages:

The application of technical solution proposed through embodiments of this invention can enable PGW to determine whether handover operation on MME side is completed through timing by timer and/or instruction message on MME side; if it is completed, re-initiate session management process of corresponding EPS system, thus enabling PGW to timely re-initiate session management process of EPS system, reducing the time for unnecessary waiting, and avoiding resource waste caused by repeated rejection of session management process of EPS system re-initiated when handover procedure is not completed, so as to improve reconnection efficiency of session management process of EPS system and reduce waste of communication resource.

The technical solution put forward by the embodiments of the present invention will be explained in combination with specific application context.

Firstly, corresponding to Solution I of the aforementioned technical solutions, application context for starting timer shall be explained by embodiments of the present invention according to information contents received by PGW under the following two conditions:

Context I: PGW Receives the Message Containing Reject Cause

After receiving the message containing reject cause, PGW will determine that session management process of EPS system initiated by PGW is rejected for MME is in handover procedure according to the content of reject cause. Thus, PGW starts the timer preset for this condition and judges that handover procedure is completed under the following two conditions:

Receive signalling of S5/S8 interface or timer times out.

Figure 3:
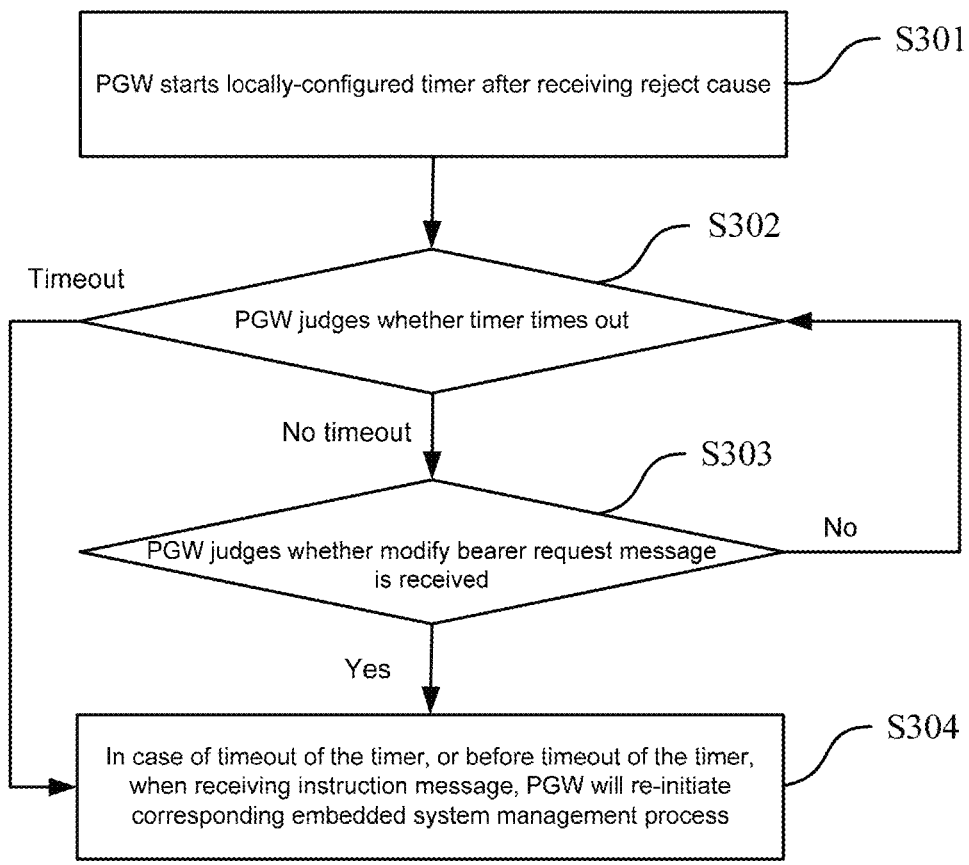
FIG. 3 is a flow diagram of a method for re-initiating session management process of EPS system in specific application context put forward by the embodiments of the present invention.

The flow diagram of a method for re-initiating session management process of EPS system in specific application context put forward by the embodiments of the present invention is shown in FIG. 3, including:

Step S301: After receiving reject cause, PGW starts locally-configured timer.

The time of the timer here can be preset according to duration of general handover procedure.

Step S302: PGW judges whether timer times out.

Implement Step S304 if it does;

Otherwise implement Step S303.

Step S303: PGW judges whether modify bearer request message at S5/S8 interface is received.

Implement Step S304 if it does;

Otherwise return to Step S302.

Step S304: PGW judges that handover procedure is completed and re-initiates dedicated bearer related procedures.

Context II: PGW Receives the Message Containing Handover Process Completion Time When MME rejects dedicated bearer related procedures initiated by PGW, it will indicate PGW when handover procedure is completed. Based on this, PGW will start the timer and judge that handover procedure is completed under two conditions below:

Receive signalling of S5/S8 interface or timer times out.

Figure 4:
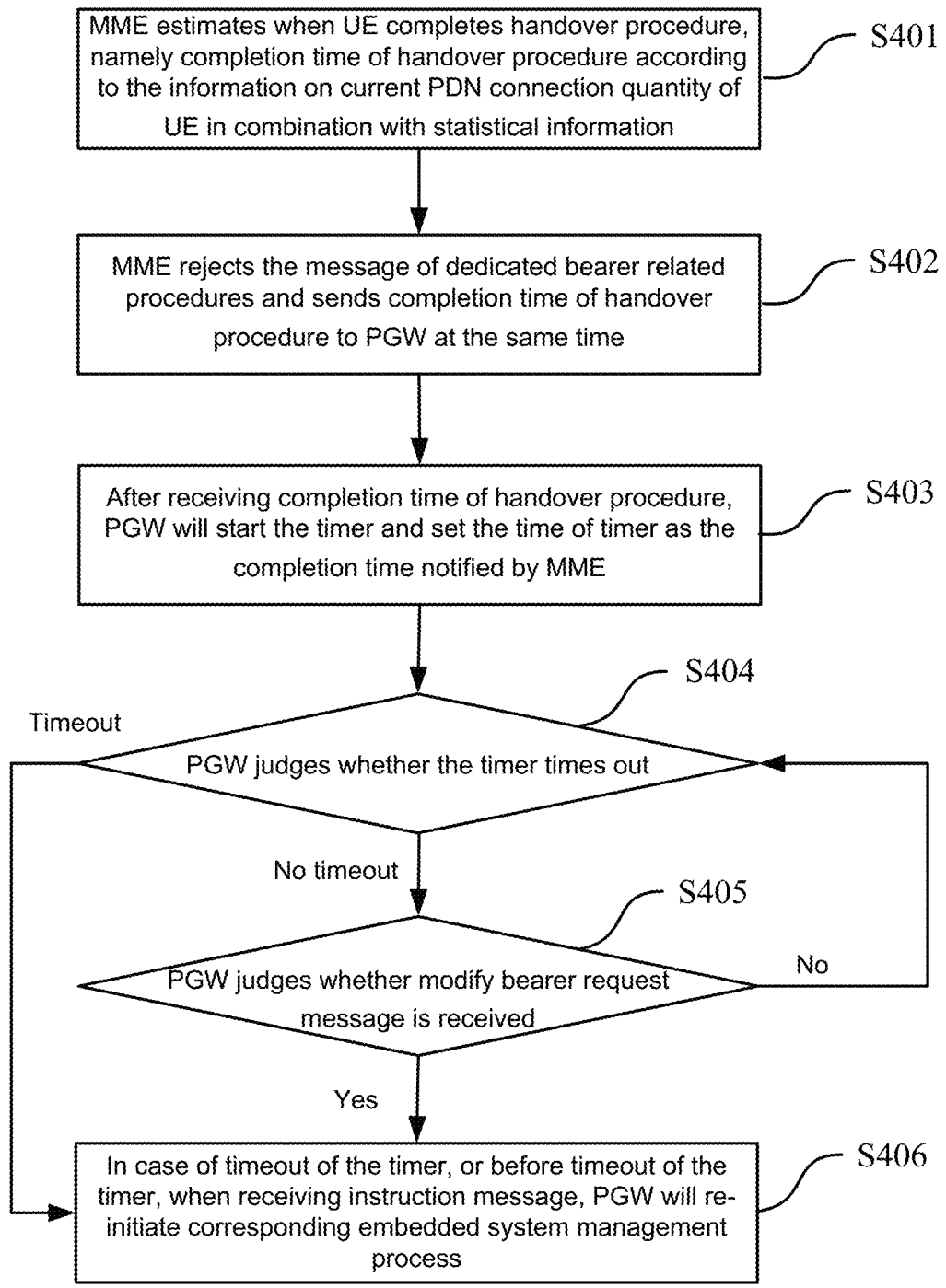
FIG. 4 is a flow diagram of a method for re-initiating session management process of EPS system in specific application context put forward by the embodiments of the present invention.

The flow diagram of a method for re-initiating session management process of EPS system in specific application context put forward by the embodiments of the present invention is shown in FIG. 4, including the following steps:

Step S401: MME estimates when UE finishes handover procedure, namely completion time of handover procedure according to the information on current PDN connection quantity of UE in combination with statistical information.

Step S402: MME rejects the message of dedicated bearer related procedures and sends completion time of handover procedure to PGW at the same time.

Step S403: After receiving completion time of handover procedure, PGW will start the timer and set the time of timer as the completion time notified by MME.

Step S404: PGW judges whether timer times out.
Implement Step S406 if it does;
Otherwise implement Step S405.
Step S405: PGW judges whether modify bearer request message at S5/S8 interface is received.
Implement Step S406 if it does;
Otherwise return to Step S404.
Step S406: PGW judges that handover procedure is completed and re-initiates dedicated bearer related procedures.

Furthermore, corresponding to Solution II of the aforementioned technical solutions, processing procedures corresponding to application context for not starting timer is explained by the embodiments of the present invention as follows:

After completing handover procedure, MME sends instruction to PGW to inform it that the handover procedure is over; after receiving the instruction sent by MME, PGW may re-initiate dedicated bearer related procedures.

Figure 5:
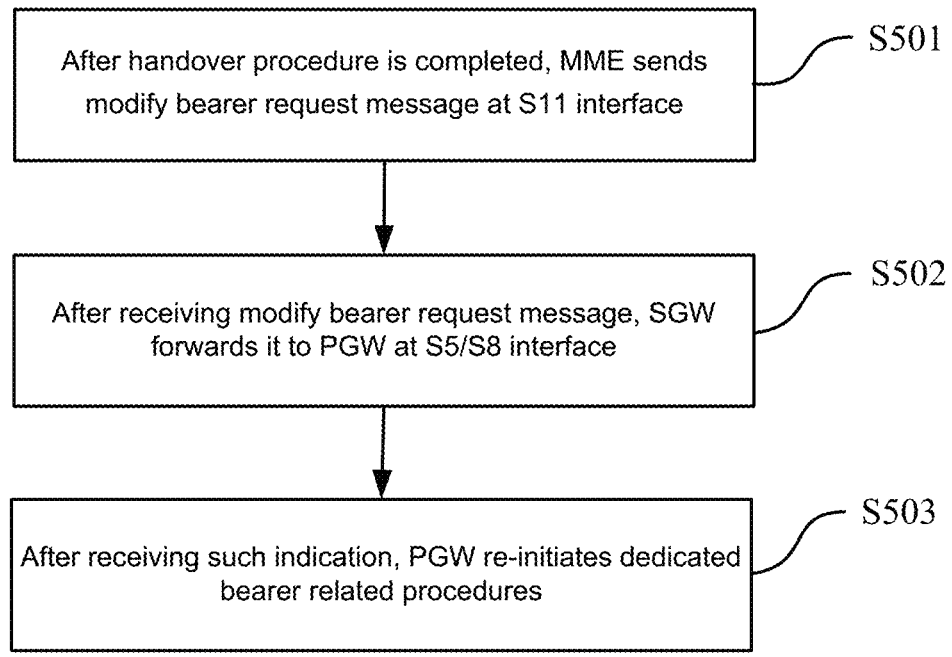
FIG. 5 is a flow diagram of a method for re-initiating session management process of EPS system in specific application context on eNB side put forward by the embodiments of the present invention.

Further, the flow diagram of a method for re-initiating session management process of EPS system in specific application context put forward by the embodiments of the present invention is shown in FIG. 5, including the following steps:

Step S501: After handover procedure is completed, MME sends modify bearer request message at S11 interface. This message carries re-initiate indication to be sent to SGW.

Step S502: After receiving modify bearer request message, SGW forwards it to PGW at S5/S8 interface.

Step S503: After receiving such indication, PGW re-initiates dedicated bearer related procedures.

Herein, in specific application context, format definition of Modify Bearer Request message is shown in Table 1:

TABLE 1

Format Definition of Modify Bearer Request Message

| Information elements | P | Condition/Comment | IE Type | Ins. |
|---|---|---|---|---|
| ME Identity (MEI) | C | This IE shall be sent on the S5/S8 interfaces for the Gn/Gp SGSN to MME TAU. | MEI | 0 |
| User Location Information (ULI) | C | The MME/SGSN shall include this IE for TAU/RAU/Handover procedures if the PGW has requested location information change reporting and MME/SGSN support location information change reporting. An MME/SGSN which supports location information change shall include this IE for UE-initiated Service Request procedure if the PGW has requested location information change reporting and the UE's location info has changed. The SGW shall include this IE on S5/S8 if it receives the ULI from MME/SGSN. | ULI | 0 |
| | O | This IE shall also be included on the S4/S11 interface for a TAU/RAU/Handover with MME/SGSN change without SGW change procedure, if the level of support changes the MME shall include the ECGI/TAI in the ULI, the SGSN shall include the CGI/SAI in the ULI. The SGW shall include this IE on S5/S8 if it receives the ULI from MME/SGSN. | | |
| Serving Network | C | This IE shall be sent on S5/S8 for a TAU with an associated MME change and the SGW change. | Serving Network | 0 |
| | O | This IE shall be included on S5/S8 for a RAU/Handover with an associated SGSN/MME change and SGW change | | |
| RAT Type | C | This IE shall be sent on the S11 interface for a TAU with anSGSN interaction, UE triggered Service Request or an I-RAT Handover.This IE shall be sent on the S5/S8 interface for achange of RAT type. This IE shall be sent on the S4 interface for aRAU with MME interaction, a RAU with an SGSN change, a UE Initiated Service Request or an I-RAT Handover. | RAT Type | 0 |
| Indication Flags | C | This IE shall be included if any one of the applicable flags is set to 1. Applicable flags are: ISRAI: This flag shall be used on S4/S11 interface and set to 1 if the ISR is established between the MME and the S4 SGSN. Handover Indication: This flag shall be set for an E-UTRAN Initial Attach or for a UE Requested PDN Connectivity, if the UE comes from a non-3GPP access. Direct Tunnel Flag: This flag shall be used on the S4 interface and set to 1 if Direct Tunnel is used. Change Reporting support Indication: shall be used on S4/S11, S5/S8 and set if the SGSN/MME supports location Info Change Reporting. This flag should be ignored by SGW if no message is sent on S5/S8. Change F-TEID support Indication: This flag shall be used on S4/S11 for an IDLE state UE initiated TAU/RAU procedure and set to 1 to allow the SGW changing the GTP-U F-TEID. | Indication | 0 |

TABLE 1-continued

Format Definition of Modify Bearer Request Message

| Information elements | P | Condition/Comment | IE Type | Ins. |
|---|---|---|---|---|
| | | Re-initiate indication: This flag shall be included on S11 and S5/S8 interface to tell PGW to re-initiate the dedicated bearer activation/modification/deactivation procedure which was rejected by the MME because a handover procedure was in progress at the same time. | | |
| Sender F-TEID for Control Plane | C | This IE shall be sent on the S11 and S4 interfaces for a TAU/RAU/Handover with MME/SGSN change and without any SGW change. This IE shall be sent on the S5 and S8 interfaces for a TAU/RAU/Handover with a SGW change. | F-TEID | 0 |
| Aggregate Maximum Bit Rate (APN-AMBR) | C | The APN-AMBR shall be sent for the PS mobility from the Gn/Gp SGSN to the S4 SGSN/MME procedures.. | AMBR | 0 |
| Delay Downlink Packet Notification Request | C | This IE shall be sent on the S11 interface for a UE triggered Service Request. | Delay Value | 0 |
| Bearer Contexts to be modified | C | This IE shall not be sent on the S5/S8 interface for a UE triggered Service Request. When Handover Indication flag is set to 1 (i.e., for EUTRAN Initial Attach or UE Requested PDN Connectivity when the UE comes from non-3GPP access), the PGW shall ignore this IE.See NOTE 1. Several IEs with the same type and instance value may be included as necessary to represent a list of Bearers to be modified. During a TAU/RAU/Handover procedure with an SGW change, the SGW includes all bearers it received from the MME/SGSN (Bearer Contexts to be created, or Bearer Contexts to be modified and also Bearer Contexts to be removed) into the list of 'Bearer Contexts to be modified' IEs, which are then sent on the S5/S8 interface to the PGW(see NOTE 2). | Bearer Context | 0 |
| Bearer Contexts to be removed | C | This IE shall be included on the S4 and S11 interfaces for the TAU/RAU/Handover and Service Request procedures where any of the bearers existing before the TAU/RAU/Handover procedure and Service Request procedures will be deactivated as consequence of the TAU/RAU/Handover procedure and Service Request procedures.(NOTE 3) For each of those bearers, an IE with the same type and instance value, shall be included. | Bearer Context | 1 |
| Recovery | C | This IE shall be included if contacting the peer for the first time | Recovery | 0 |
| UE Time Zone | O | This IE may be included by the MME on the S11 interface or by the SGSN on the S4 interface. | UE Time Zone | 0 |
| | C | If SGW receives this IE, SGW shall forward it to PGW across S5/S8 interface. | | |
| MME-FQ-CSID | C | This IE shall be included by MME on S11 and shall be forwarded by SGW on S5/S8 according to the requirements in 3GPP TS 23.007 [17]. | FQ-CSID | 0 |
| SGW-FQ-CSID | C | This IE shall be included by SGW on S5/S8 according to the requirements in 3GPP TS 23.007 [17]. | FQ-CSID | 1 |
| User CSG Information (UCI) | O | The MME/SGSN shall include this IE for TAU/RAU/Handover procedures and UE-initiated Service Request procedure if the PGW has requested CSG Info reporting and the MME/SGSN support the CSG information reporting. The SGW shall include this IE on S5/S8 if it receives the User CSG Information from MME/SGSN. | UCI | 0 |
| Private Extension | O | | Private Extension | VS |

NOTE 1: This requirement is introduced for backwards compatibility reasons. If Bearer Contexts to be modified IE(s) is received in the Modify Bearer Request message, the PGW shall include corresponding Bearer Contexts modified IE(s) in the Modify Bearer Response message.
(NOTE 2): According to the description in 3GPP TS 23.401 [3] e.g. subclause 5.3.3.1 "Tracking Area Update procedure with Serving GW change" and 3GPP TS 23.060 [35], during a TAU/RAU/Handover procedure with an SGW change, if the SGW receives 'Bearer Context to be removed' IEs, the SGW shall allocate the S5/8-U SGW F-TEID for those bearers and include also these bearers in the 'Bearer contexts to be modified' IE, which is then sent within this message on the S5/S8 interface to the PGW.
(NOTE 3): The 'Bearer Contexts to be removed' IE signals to the SGW that these bearers will be removed by the MME/SGSN later on by separate procedures (e.g. MME/S4-SGSN initiated Dedicated Bearer Deactivation procedure). Therefore, the SGW will not delete these bearers during the ongoing TAU/RAU/Handover procedure (without an SGW change), a Handover procedure (with an SGW change except for an X2-Handover) and a Service Request procedure.

Furthermore, the definition of re-initiate indication is shown in Table 2.

TABLE 2

Definition of Re-initiate Indication

| Octets | Bits | | | | | | | |
|---|---|---|---|---|---|---|---|---|
| | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | Instance | | | |
| 5 | DAF | DTF | HI | DFI | OI | ISRSI | ISRAI | SGWCI |
| 6 | RE | UIMSI | CFSI | CRSI | P | PT | SI | MSV |
| 7 to (n + 4) | These octet(s) is/are present only if explicitly specified | | | | | | | |

Figure 8:
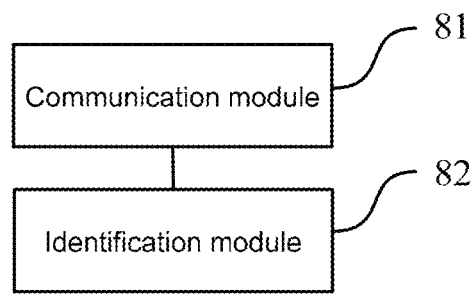
FIG. 8 is a structure diagram of PGW put forward by the embodiments of the present invention.

FIG. 8.12-1: Indication

The following bits within Octet 6 shall indicate:

Bit 8—RE, If this bit is set to 1, it indicates that the handover procedure is completed, the PGW could re-initiate the dedicated bearer related procedure which was rejected by the MME due to conflict with the handover procedure.

It should be further pointed out that there are other possible formats besides the ones in the above embodiments, which will not be listed hereinafter. Only typical formats are listed here. Formats conforming to the idea of technical solution put forward by the embodiments of the present invention shall be protected by the present invention.

Compared with present technology, the embodiments of the present invention have the following advantages:

The application of technical solution proposed through embodiment of this invention can enable PGW to determine whether handover operation on MME side is completed through timing by timer and/or instruction message on MME side; if it is completed, re-initiate session management process of corresponding EPS system, thus enabling PGW to timely re-initiate session management process of EPS system, reducing the time for unnecessary waiting, and avoiding resource waste caused by repeated rejection of session management process of EPS system re-initiated when handover procedure is not completed, thus to improve reconnection efficiency of session management process of EPS system and reduce waste of communication resource.

Figure 6:
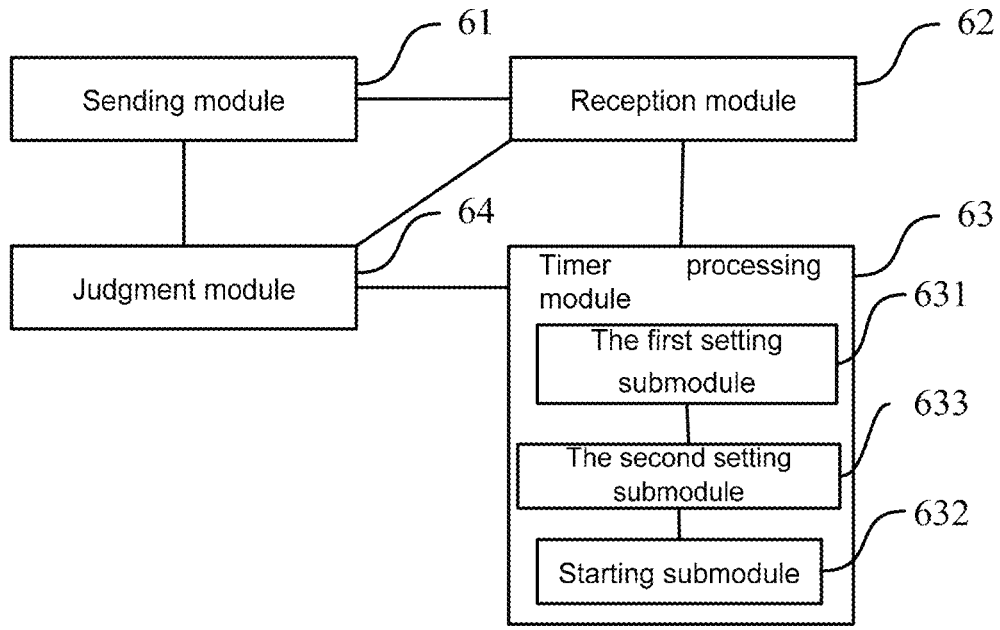
FIG. 6 is a structure diagram of PGW put forward by the embodiments of the present invention.

To realize technical solutions, the embodiments of the present invention also provide corresponding devices, which are explained below:

Herein, corresponding to the aforementioned Solution I, the embodiments of the present invention put forward a kind of PGW, whose structure diagram is shown in FIG. 6, including:

Sending module 61, which is used to initiate session management process of EPS system to MME;

Reception module 62, which is used to receive the information sent by MME after session management process of EPS system initiated by sending module 61 is rejected by MME for handover procedure is in progress;

Timer processing module 63, which is used to start timer according to the information received by reception module 62, including:

The first setting submodule 631, which is used to set time alarm and corresponding content of reject cause according to preset information of PGW;

The second setting submodule 632, which is used to set time alarm according to the information of handover completion time received by reception module 62;

Starting submodule 633, which is used to start the timer set by the first setting submodule 631 when reception module 62 receives the message containing the information of rejecting cause sent by MME and the content of reject cause is consistent to that set by the first setting submodule 631, or start the timer set by the second setting submodule 632 when reception module 62 receives the message sent by MME and containing the information of handover completion time.

Judgment module 64, which is used to notify sending module 61 to re-initiate session management process of corresponding EPS system when the timer started by timer processing module 63 times out, or reception module 62 receives instruction message before the timer started by timer processing module 63 times out.

Herein, before the timer started by timer processing module 63 times out, reception module 62 receives instruction message, including:

Before the timer started by timer processing module 63 times out, reception module 62 receives modify bearer request message through S5/S8 interface.

In actual application, modify bearer request message received by PGW is forwarded by SGW or triggered by SGW according to create bearer request message, but the change of specific source will not influence protection scope of this invention.

It should be noted that, in the descriptions above, session management process of EPS system specifically comprises dedicated bearer process corresponding to concrete application context.

Figure 7:
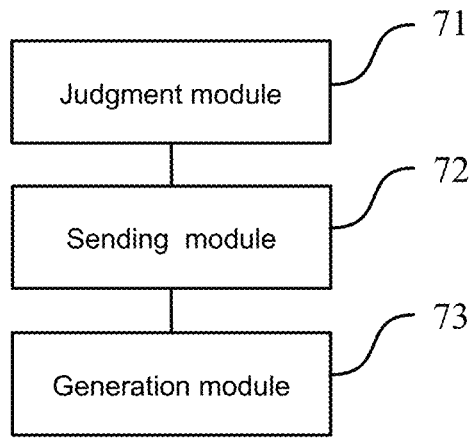
FIG. 7 is a structure diagram of MME put forward by the embodiments of the present invention.

Moreover, corresponding to Solution I, the embodiments of the present invention also provide a kind of MME, whose structure diagram is shown in FIG. 7, including:

Judgment module 71, which is used to judge whether MME is in handover procedure when session management process request of EPS system initiated by PGW is received;

Sending module 72, which is used to send the message containing instruction information to PGW when the judgment result of judgment module is "Yes", to enable PGW to start corresponding timer for re-initiating session management process of corresponding EPS system.

In specific application context, sending module 72 is specifically used to:

Send the message containing the information of rejecting cause to PGW; and/or,

Send the message containing the information of handover completion time to PGW.

Furthermore, MME also includes generation module 73, which is used to determine handover completion time according to current PDN connection quantity of corresponding terminal unit and statistical information of handover delay, and send it to PGW through sending module 72.

It should be pointed out that sending module 72 is also used to:

Send modify bearer request message to PGW through S5/S8 interface after handover procedure is completed; or, Send modify bearer request message to other network equipments after handover procedure is completed, and other network equipments will forward modify bearer request message to PGW through S5/S8 interface.

It should be noted that, in the descriptions above, session management process of EPS system specifically comprises dedicated bearer process corresponding to concrete application context.

Furthermore, corresponding to the aforementioned Solution II, the embodiments of the present invention also provide a kind of PGW, whose structure diagram is shown in FIG. 8, including:

Communication module 81, which is used to initiate session management process of EPS system to MME and receive the message sent by MME;

Identification module 82, which is used to identify whether communication module 81 receives instruction message after session management process of EPS system initiated by sending module is rejected by MME for handover procedure is in progress, and notify communication module 81 to re-initiate session management process of corresponding EPS system when identification result is "Yes".

Herein, instruction message includes:

Modify bearer request message received by communication module 81 through S5/S8 interface.

In actual application, Modify bearer request message received by PGW is forwarded by SGW or triggered by SGW according to create bearer request message, but the change of specific source will not influence protection scope of this invention.

Figure 9:
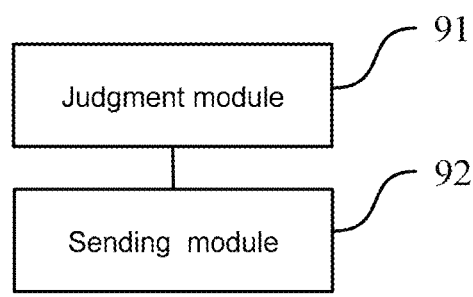
FIG. 9 is a structure diagram of MME put forward by the embodiments of the present invention.

It should be noted that, in the descriptions above, session management process of EPS system specifically comprises dedicated bearer process corresponding to concrete application context. Moreover, corresponding to the aforementioned Solution II, the embodiments of the present invention also provide a kind of MME, whose structure diagram is shown in FIG. 9, including:

Judgment module 91, which is used to judge whether MME is in handover procedure when session management process request of EPS system initiated by PGW is received, and whether handover procedure is completed when MME is in handover procedure;

Sending module 92, which is used to send instruction message to PGW to notify PGW to re-initiate session management process of corresponding EPS system when judgment module 91 judges handover procedure is completed.

In specific application context, sending module 92 is specifically used to:

Send modify bearer request message to PGW through S5/S8 interface when judgment module 91 judges handover procedure is completed; and/or, Send modify bearer request message to other network equipments when judgment module 91 judges handover procedure is completed, and other network equipments will forward modify bearer request message to PGW through S5/S8 interface.

It should be noted that, in the descriptions above, session management process of EPS system specifically comprises dedicated bearer process corresponding to concrete application context.

Compared with present technology, the embodiments of the present invention have the following advantages:

The application of technical solution proposed through embodiment of this invention can enable PGW to determine whether handover operation on MME side is completed through timing by timer and/or instruction message on MME side; if it is completed, re-initiate session management process of corresponding EPS system, thus enabling PGW to timely re-initiate session management process of EPS system, reducing the time for unnecessary waiting, and avoiding resource waste caused by repeated rejection of session management process of EPS system re-initiated when handover procedure is not completed, so as to improve reconnection efficiency of session management process of EPS system and reduce waste of communication resource. Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to implement the methods described in all embodiments of the present invention.

Technical personnel of the field can understand that the drawings only refer to the diagram of a preferred embodiment, and the module or procedure is not indispensable for the implementation of the embodiments of the present invention.

Technical personnel of the field can understand that the module of the unit of an embodiment can be distributed in such unit according to embodiment description, or located in one or several units of another embodiment based on corresponding changes. Modules of the embodiments mentioned above can be merged into one module, or further divided into multiple submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

What is claimed is:

1. A method for re-initiating a session management process of an Evolved Packet System (EPS), the method comprising:
    after the session management process of the EPS initiated by a packet data gateway (PGW) is rejected by a mobility management entity (MME) because a handover procedure is in progress, starting a timer by the PGW according to information sent by the MME;
    after the PGW receives a preset instruction message before the timer times out, re-initiating the session management process of the EPS by the PGW.

2. The method as claimed in claim 1, wherein starting a timer by the PGW according to information sent by the MME, comprising:
    after the PGW receives a message containing information of rejecting cause sent by the MME, if content of the information of rejection cause conforms to a pre-configured condition, starting a pre-configured timer by the PGW;
    after the PGW receives a message containing an end time of the handover procedure from the MME, starting the timer set according to the end time by the PGW.

3. The method as claimed in claim 1, wherein the receipt of a preset instruction message by the PGW before the timer times out includes that:
    the PGW receives a Modify Bearer Request message through an S5/S8 interface before the timer times out.

4. The method as claimed in claim 1, wherein the session management process of the EPS is a session management process for dedicated bearer.

5. A packet data gateway (PGW), comprising:
a sending module, configured to initiate a session management process of an Evolved Packet System (EPS) to a mobility management entity (MME);
a reception module, configured to receive information sent by the MME after the session management process of the EPS initiated by the sending module is rejected by the MME because a handover procedure is in progress;
a timer processing module, configured to start a timer according to the information received by the reception module;
a judgment module, configured to notify the sending module to re-initiate the session management process of the EPS after the reception module receives a preset instruction message before the timer started by the timer processing module times out.

6. The PGW as claimed in claim 5, wherein the timer processing module comprises:
a first setting submodule, configured to set a time alarm and corresponding content of reject cause according to preset information of the PGW;
a second setting submodule, configured to set the time alarm according to information of an end time of the handover procedure received by the reception module;
a starting submodule, configured to start the timer set by the first setting submodule when the reception module receives the message containing the information of rejecting cause sent by the MME and the content of reject cause is consistent to that set by the first setting submodule; or start the timer set by the second setting submodule when the reception module receives the message containing the information of the end time of the handover procedure sent by the MME.

7. The PGW as claimed in claim 5, wherein the receipt of a a preset instruction message by the reception module before the timer started by the timer processing module times out, comprises that:
the reception module receives a modify bearer request message through an S5/S8interface before the timer started by the timer processing module times out.

8. The PGW as claimed in claim 5, wherein the session management process of the EPS is a session management process for dedicated bearer.

9. A method for re-initiating a session management process of an Evolved Packet System (EPS), the method comprising:
after a mobility management entity (MME) receives a request from a packet data gateway (PGW) for initiating the session management process of EPS, if the MME judges itself is in a handover procedure, sending message containing instruction information to the PGW and rejecting the request of session management process of the EPS by the MME;
sending, by the MME, a preset instruction message to the PGW before a timer started by the PGW according to the message containing instruction information sent by the MME expires to notify the PGW to re-initiate the session management process of the EPS.

10. The method as claimed in claim 9, wherein the sending of message containing instruction information to the PGW by MME comprises that:
sending the message containing the information of rejecting reasons to the PGW by the MME; and/or,
sending the message containing the information of an end time of the handover procedure to the PGW by the MME.

11. The method as claimed in claim 9, wherein the MME sends instruction message to the PGW after the handover procedure is completed, wherein
after the handover procedure is completed, sending a modify bearer request message to the PGW through an S5/S8 interface by the MME; or,
after the handover procedure is completed, sending the modify bearer request message to other network equipments by the MME, and the other network equipments forward the modify bearer request message to the PGW through the S5/S8 interface.

12. The method as claimed in claim 9, wherein the session management process of the EPS is a session management process for dedicated bearer.

* * * * *